W<sup>m</sup> F. Collier and J. H. Bigelow,
Broiler and Toaster.
N° 76,032.            Patented Mar. 24. 1868.
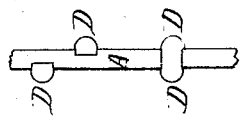
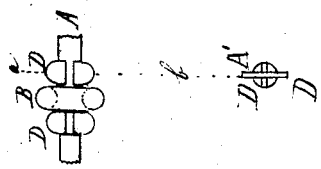
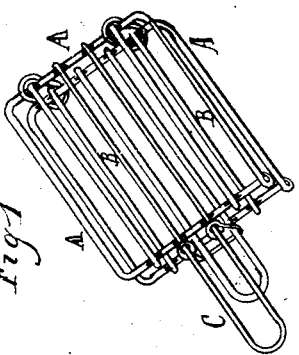
Witnesses            Inventors
O. E. Ackly            W<sup>m</sup> F. Collier
James G. Arnold            J. H. Bigelow